No. 688,083. Patented Dec. 3, 1901.
J. W. GHEEN.
CAN SOLDERING MACHINE.
(Application filed Mar. 15, 1901.)
(No Model.)
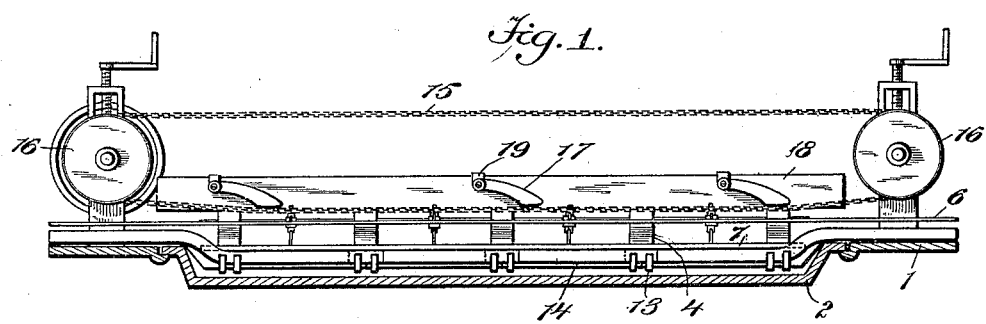
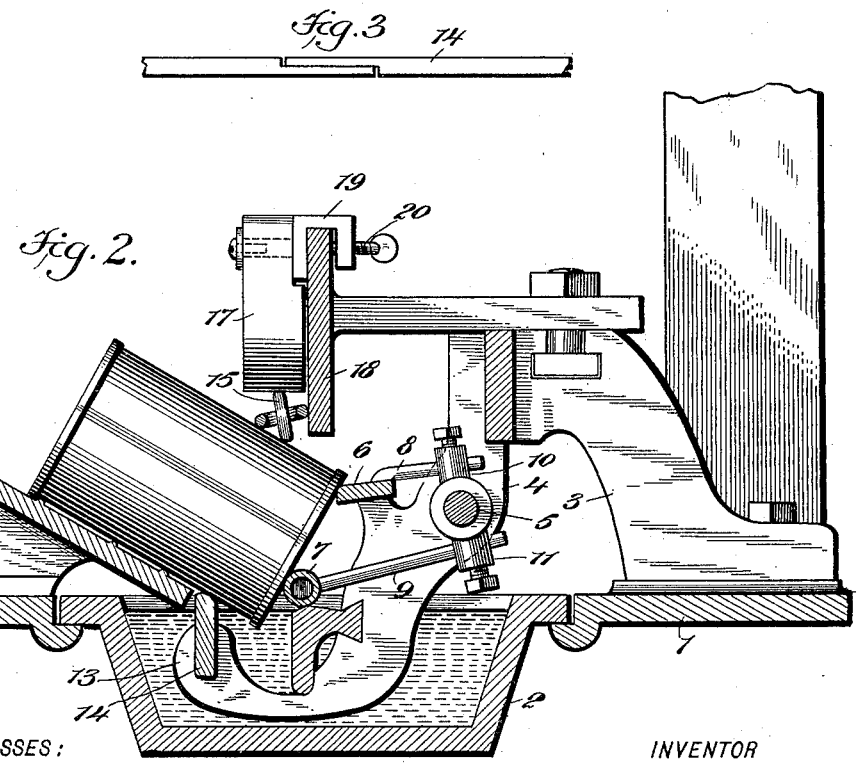
INVENTOR
John W. Gheen

UNITED STATES PATENT OFFICE.

JOHN W. GHEEN, OF ASTORIA, OREGON.

CAN-SOLDERING MACHINE.

SPECIFICATION forming part of Letters Patent No. 688,083, dated December 3, 1901.

Application filed March 15, 1901. Serial No. 51,299. (No model.)

*To all whom it may concern:*

Be it known that I, JOHN W. GHEEN, a citizen of the United States, and a resident of Astoria, in the county of Clatsop and State of Oregon, have invented a new and Improved Can-Soldering Machine, of which the following is a full, clear, and exact description.

This invention relates particularly to improvements in the solder or guide bars of can-soldering machines; and an object is to provide a bar so constructed and arranged that it will not be perceptibly distorted or warped by expansion, thus maintaining its parallelism with relation to the upper guides and causing an equal immersion of the can-heads throughout their circumference. Another object is to make the chain-holding weights adjustable.

I will describe a can-soldering machine embodying my invention and then point out the novel features in the appended claims.

Reference is to be had to the accompanying drawings, forming a part of this specification, in which similar characters of reference indicate corresponding parts in all the figures.

Figure 1 is a partial longitudinal section and partial front elevation of a can-soldering machine, showing my invention. Fig. 2 is a cross-section thereof on an enlarged scale, and Fig. 3 is a detail view showing the lapping of the ends of the bar-sections.

Referring to the drawings, 1 designates a table or platform in which a tank 2 for molten solder is arranged, the solder being kept in liquid form by any suitable heating device. Attached to brackets 3, mounted on the table or platform, is a bar, and on this bar are hangers 4, arranged at suitable distances apart along the tank, the lower portions of these hangers being extended nearly to the bottom of said tank. Extended through these hangers near the top is a bar 5, and adjustable on this bar 5 are the guide-bars 6 and 7, designed to be engaged by the end of a can, as shown in Fig. 2. These guide-bars 6 and 7 are respectively mounted on arms 8 and 9, adjustable in collars 10 and 11, mounted on said bar 5, and held as adjusted by set-screws.

At the opposite side of the table an inclined apron 12 is arranged, upon which the cans to be soldered are rolled.

The upwardly-turned ends 13 of the hangers 4 are provided with recesses to receive the lower guide or supporting bar 14. This lower or supporting bar between its ends extends downward into the molten solder, as clearly indicated in Fig. 1, while its ends are turned upward and carried over the table or platform. The bar 14 is made in short sections, as indicated in Fig. 1, and the adjacent ends of the sections are halved and lapped over one upon another so as not to interfere with the rolling of the cans over the same at the joints. The object in making this bar in sections is to prevent it being warped or bent by the molten solder, therefore maintaining its parallelism with the guides 6 and 7, which guides are kept parallel by means of the rods 8 and 9, which are arranged at short intervals. The collars from which the arms are extended are loose on the rod 5, allowing free movement in the expanding of the guide-bars.

The cans to be soldered are moved over the apron 12 by means of an endless chain 15, which extends around rollers 16 at the opposite ends of the machine. The said rollers are supported on suitable standards, and a pulley may be attached to the shaft of one of them, to which the driving power may be applied. The lower stretch of the chain 15 is held in close contact with the upper sides of the cans by means of swinging weights 17, which engage with the upper side of said lower stretch, as clearly indicated in the drawings. These weights 17 are adjustable along a bar 18. As here shown, each weight is connected to a clamp 19, designed to engage over the upper edge of said bar 18 and secured in position by a screw 20.

Having thus described my invention, I claim as new and desire to secure by Letters Patent—

1. In a can-soldering machine, a tank for molten solder, and a guide or holding bar extended through said tank, the said guide or holding bar being formed in independent sections overlapping at the ends, substantially as specified.

2. In a can-soldering machine, a tank for molten solder, guide-bars for engaging with the ends of cans, an inclined apron over which the cans may roll, a guide or supporting bar at the lower edge of said apron, and consisting of a series of sections unconnected at the ends, and means for rolling the cans along the apron, substantially as specified.

3. In a can-soldering machine, a tank for molten solder, an apron over which the cans are designed to roll, an endless chain for rolling the cans, and holding-weights bearing upon and adjustable lengthwise of the lower stretch of said chain, substantially as specified.

4. In a can-soldering machine, brackets mounted on the machine, a bar supported by said brackets above the solder-tank, hangers extended from said bar into the tank and having upwardly-turned ends, a supporting-bar engaging with said upturned ends, a bar supported by the hangers above the tank, and guide-bars supported by said last-named bar, substantially as specified.

5. In can-soldering machines, a bar supported by brackets above the solder and having hangers extending into the molten solder, and having guide-bars secured at short intervals to loose collars upon a rod extending through the hangers, substantially as specified.

6. In can-soldering machines, a bar supported by brackets above the molten solder and having hangers for extending into the molten solder, a bar forward of the first-named bar, and chain-holding weights adapted to be clamped to the last-named bar, as herein specified.

7. In can-soldering machines, brackets, a bar supported by the brackets above the molten solder, hangers on the bar extending into the molten solder, forming a support for a bar formed in independent sections, and guide-bars, substantially as herein specified.

8. In can-soldering machines, brackets on the machine, a bar supported by the brackets above the molten solder, and hangers on the bar extending into and running beneath the surface of the molten solder, to form a support for a track upon which the cans may roll, substantially as specified.

In testimony whereof I have signed my name to this specification in the presence of two subscribing witnesses.

JOHN W. GHEEN.

Witnesses:
FRANK SPITTLE,
RALPH L. KNAPP.